United States Patent
Balan et al.

(10) Patent No.: US 10,671,841 B2
(45) Date of Patent: Jun. 2, 2020

(54) ATTRIBUTE STATE CLASSIFICATION

(75) Inventors: Alexandru O. Balan, Redmond, WA (US); Richard E. Moore, Redmond, WA (US); Mark J. Finocchio, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 407 days.

(21) Appl. No.: 13/098,899

(22) Filed: May 2, 2011

(65) Prior Publication Data

US 2012/0280897 A1 Nov. 8, 2012

(51) Int. Cl.
*G06F 3/01* (2006.01)
*G06K 9/00* (2006.01)
*G06F 3/03* (2006.01)

(52) U.S. Cl.
CPC .......... *G06K 9/00355* (2013.01); *G06F 3/017* (2013.01); *G06F 3/0304* (2013.01)

(58) Field of Classification Search
CPC .......... G06F 3/017; G06F 3/0304; G06F 3/01; G06K 9/00355
USPC ....................................................... 715/863
See application file for complete search history.

(56) References Cited

U.S. PATENT DOCUMENTS

| | | | |
|---|---|---|---|
| 4,288,078 A | 9/1981 | Lugo | |
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |

(Continued)

FOREIGN PATENT DOCUMENTS

| | | |
|---|---|---|
| CN | 201254344 | 3/2008 |
| CN | 100409261 C | 8/2008 |

(Continued)

OTHER PUBLICATIONS

Plagemann, et al., "Real-time Identification and Localization of Body Parts from Depth Images", Retrieved at << http://ieeexplore.ieee.org/stamp/stamp.jsp?tp=&arnumber=5509559 >>, IEEE International Conference on Robotics and Automation (ICRA), May 3-7, 2010, pp. 6.

(Continued)

*Primary Examiner* — Jeff Piziali
(74) *Attorney, Agent, or Firm* — Alleman Hall Creasman & Tuttle LLP (57) ABSTRACT

Attribute state classification techniques are described. In one or more implementations, one or more pixels of an image are classified by a computing device as having one or several states for one or more attributes that do not identify corresponding body parts of a user. A gesture is recognized by the computing device that is operable to initiate one or more operations of the computing device based at least in part of the state classifications of the one or more pixels of one or more attributes.

20 Claims, 6 Drawing Sheets

(56) References Cited

U.S. PATENT DOCUMENTS

| | | |
|---|---|---|
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,774,591 A | 6/1998 | Black et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,721,444 B1 | 4/2004 | Gu et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 * | 9/2004 | Grzeszczuk ............ G06F 3/017 345/419 |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,007,035 B2 | 2/2006 | Kamath et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,257,237 B1 | 8/2007 | Luck et al. |
| 7,259,747 B2 | 8/2007 | Bell |
| 7,289,645 B2 | 10/2007 | Yamamoto et al. |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,574,411 B2 | 8/2009 | Suontausta et al. |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |

(56) References Cited

U.S. PATENT DOCUMENTS

| | | | |
|---|---|---|---|
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 7,974,443 | B2 | 7/2011 | Kipman et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2002/0041327 | A1 | 4/2002 | Hildreth et al. |
| 2003/0085887 | A1 | 5/2003 | Hunt et al. |
| 2005/0031166 | A1* | 2/2005 | Fujimura et al. ............ 382/103 |
| 2006/0098845 | A1* | 5/2006 | Sotriropoulos et al. ...... 382/107 |
| 2006/0274947 | A1* | 12/2006 | Fujimura ........... G06K 9/00362 382/201 |
| 2008/0019589 | A1 | 1/2008 | Yoon et al. |
| 2008/0026838 | A1 | 1/2008 | Dunstan et al. |
| 2008/0037875 | A1* | 2/2008 | Kim et al. .................... 382/199 |
| 2008/0107303 | A1* | 5/2008 | Kim et al. .................... 382/103 |
| 2008/0201340 | A1 | 8/2008 | Thonangi |
| 2008/0212836 | A1* | 9/2008 | Fujimura et al. ............ 382/103 |
| 2008/0267447 | A1* | 10/2008 | Kelusky et al. ............. 382/100 |
| 2009/0027337 | A1* | 1/2009 | Hildreth ....................... 345/158 |
| 2009/0110292 | A1 | 4/2009 | Fujimura et al. |
| 2009/0228841 | A1* | 9/2009 | Hildreth ....................... 715/863 |
| 2009/0315740 | A1* | 12/2009 | Hildreth et al. ............... 341/20 |
| 2010/0034457 | A1 | 2/2010 | Berliner et al. |
| 2010/0094800 | A1 | 4/2010 | Sharp |
| 2010/0194872 | A1 | 8/2010 | Mathe et al. |
| 2010/0197390 | A1 | 8/2010 | Craig et al. |
| 2010/0197392 | A1 | 8/2010 | Geiss |
| 2010/0214322 | A1 | 8/2010 | Lim et al. |
| 2010/0215257 | A1 | 8/2010 | Dariush et al. |
| 2012/0092445 | A1 | 4/2012 | McDowell et al. |
| 2012/0154373 | A1 | 6/2012 | Finocchio et al. |
| 2012/0163723 | A1 | 6/2012 | Balan et al. |

FOREIGN PATENT DOCUMENTS

| | | |
|---|---|---|
| CN | 101246602 A | 8/2008 |
| CN | 101320344 A | 12/2008 |
| EP | 0583061 | 2/1994 |
| JP | 08044490 | 2/1996 |
| WO | WO-9310708 | 6/1993 |
| WO | WO-9717598 | 5/1997 |
| WO | WO-9944698 | 9/1999 |

OTHER PUBLICATIONS

Cohen, et al., "Inference of Human Postures by Classification of 3D Human Body Shape", Retrieved at << http://ieeexplore.ieee.org/stamp/stamp.jsp?tp=&arnumber=1240827 >>, IEEE International Workshop on Analysis and Modeling of Faces and Gestures, Oct. 17, 2003, pp. 8.

Jüngling, et al., "Feature based Person Detection beyond the Visible Spectrum", Retrieved at << http://ieeexplore.ieee.org/stamp/stamp.jsp?tp=&arnumber=5204085 >>, IEEE Computer Society Conference on Computer Vision and Pattern Recognition Workshops, Jun. 20-25, 2009, pp. 30-37.

Khan, et al., "Real-time Human Motion Detection and Classification", Retrieved at << http://ieeexplore.ieee.org/stamp/stamp.jsp?tp=&arnumber=1215953 >>, IEEE Proceedings Students Conference, Aug. 16-17, 2002, pp. 135-139.

"Parallel Processing Machine Learning Decision Tree Training", Filed Date: Dec. 15, 2010, U.S. Appl. No. 12/969,112, pp. 1-27.

"Classification of Posture States", Filed Date: Dec. 28, 2010, U.S. Appl. No. 12/979,897, pp. 1-24.

"Human motion-capture for Xbox Kinect", Retrieved at << http://research.microsoft.com/en-us/projects/vrkinect/ >>, Retrieved Date: Apr. 15, 2011, pp. 3.

"Simulation and Training", Division Incorporated,(1994), 6 Pages.

"Virtual High Anxiety", *Tech update*, (Aug. 1995), 1 Page.

Aggarwal, et al., "Human Motion Analysis: A Review", *IEEE Nonrigid and Articulated motion Workshop*, University of Texas at Austin, Austin, TX.,(1997), pp. 90-102.

Azarbayejani, et al., "Visually Controlled Graphics", *IEEE Transactions on Pattern Analysis and Machine Intelligence*, vol. 15, No. 6, (Jun. 1993), pp. 602-605.

Breen, David et al., "Interactive Occlusion and Collision of Real and Virtual Objects in Augmented Reality", *Technical report ECRC-95-02 European Computer-Industry Research Centre GmbH*, Munich, Germany, (1995), 22 Pages.

Brogan, David et al., "Dynamically Simulated Characters in Virtual Environments", vol. 18, Issue 5, *IEEE Computer Graphics and Applications*, (Sep./Oct. 1998), pp. 58-69.

Fisher, et al., "Virtual Environment Display System", *ACM Workshop on Interactive 3D Graphics*, Chapel Hill, NC, (Oct. 1986), 12 Pages.

Freeman, William et al., "Television Control by Hand Gestures", *International Workshop on Automatic Face and Gesture Recognition*, (1995), pp. 179-183.

Granieri, John P., et al., "Simulating Humans in VR", *The British Computer Society, Academic Press*, (Oct. 1994), 15 Pages.

Hasegawa, Shoichi et al., "Human-Scale Haptic Interaction with a Reactive Virtual Human in a Real-Time Physics Simulator", *ACM Computers in Entertainment*, vol. 4, No. 3, (Jul. 2006), 12 Pages.

He, Lei "Generation of Human Body Models", *University of Auckland*, New Zealand, (Apr. 2005), 111 Pages.

Hongo, Hitoshi et al., "Focus of Attention for Face and Hand Gesture Recognition Using Multiple Cameras", *4th IEEE International Conference on Automatic Face and Gesture Recognition*, Grenoble, France, (Mar. 2000), pp. 156-161.

Isard, Michael et al., "Condensation—Conditional Density Propagation for Visual Tracking", *International Journal of Computer Vision* 29(1), Netherlands, (1998), pp. 5-28.

Kanade, Takeo et al., "A Stereo Machine for Video-rate Dense Depth Mapping and Its New Applications", *IEEE Computer Society Conference on Computer Vision and Pattern Recognition*, The Robotics Institute, Carnegie Mellon University, Pittsburgh, PA,(1996), pp. 196-202.

Kohler, Marcus "Technical Details and Ergonomical Aspects of Gesture Recognition applied in Intelligent Home Environments", *Germany*, (1997), 35 Pages.

Kohler, Markus "Special Topics of Gesture Recognition Applied in Intelligent Home Environments", *In Proceedings of the Gesture Workshop*, Germany, (1998), 12 Pages.

Kohler, Markus "Vision Based Remote Control in Intelligent Home Environments", *University of Erlangen-Nuremberg*, Germany, (1996), 8 Pages.

Livingston, Mark A., "Vision-based Tracking with Dynamic Structured Light for Video See-through Augmented Reality", *The University of North Carolina at Chapel Hill*, North Carolina, USA, (1998), 145 Pages.

Miyagawa, Ryohei et al., "CCD-Based Range-Finding Sensor", *IEEE Transactions on Electron Devices*, vol. 44, No. 10, (Oct. 1997),pp. 1648-1652.

Pavlovic, Vladimir et al., "Visual Interpretation of Hand Gestures for Human-Computer Interaction: A Review", *IEEE Transactions on Pattern Analysis and Machine Intelligence*, vol. 19, No. 7, (Jul. 1997), pp. 677-695.

Qian, et al., "A Gesture-Driven Multimodal Interactive Dance System", *IEEE International Conference on Multimedia and Expo*, Taipei, (Jun. 2004), pp. 1579-1582.

Rosenhahn, Bodo et al., "Automatic Human Model Generation", *University of Auckland (CITR)*, New Zealand, (2005), pp. 41-48.

(56) References Cited

OTHER PUBLICATIONS

Shao, Jiang et al., "An Open System Architecture for a Multimedia and Multimodal User Interface", *Japanese Society for Rehabilitation of Persons with Disabilities (JSRPD)*, Japan, (Aug. 24, 1998), 8 Pages.

Sheridan, Thomas et al., "Virtual Reality Check", *Technology Review*, vol. 96, No. 7, (Oct. 1993), 9 Pages.

Stevens, Jane "Flights into Virtual Reality Treating Real World Disorders", *The Washington Post, Science Psychology*, (Mar. 27, 1995),2 Pages.

Wren, Christopher et al., "Pfinder: Real-Time Tracking of the Human Body", *IEEE Transactions on Pattern Analysis and Machine Intelligence*, vol. 19, No. 7 (Jul. 1997), pp. 780-785.

Zhao, Liang "Dressed Human Modeling, Detection, and Parts Localization", *The Robotics Institute, Carnegie Mellon University*, Pittsburgh, PA, (2001), 121 Pages.

"Distributed Decision Tree Induction", retrieved from <http://www.slideshare.net/gregoryg/distributed-decision-tree-induction> on Sep. 28, 2010,3 pages.

"High Performance Computing (HPC)—Supercomputing with NVIDIA Tesla", retrieved from <http://www.nvidia.com/object/tesla_computing_solutions.html>,2 pages.

Athitsos, Vassilis et al., "An Appearance-Based Framework for 3D Hand Shape Classification and Camera Viewpoint Estimation", *Proceedings of the 5th IEEE International Conference on Automatic Face and Gesture Recognition*, available at <http://luthuli.cs.uiuc.edu/~daf/courses/AppCV/Papers/01004129.pdf>,(2002),6 pages.

Coates, Adam et al., "Scalable Learning for Object Detection with GPU Hardware", available at <http://www.stanford.edu/~acoates/papers/coates_iros2009.ps>,(2009),7 pages.

Huisman, Johan A., "High-Speed Parallel Processing on CUDA-Enabled Graphics Processing Units", available at <http://repository.tudelft.nl/assets/uuid:7ab16201-272c-4f18-899c-98a7fb527093/Thesis_-_Johan_Huisman.pdf>,(2010),106 pages.

Li, Zhi et al., "Real Time Hand Gesture Recognition Using a Range Camera", Australasian Conference on Robotics and Automation (ACRA), Dec. 2-4, 2009, available at.<http://www.araa.asn.au/acra/acra2009/papers/pap128s1.pdf>,(Dec. 2, 2009),7 pages.

Sharp, Toby "Implementing Decision Trees and Forests on a GPU", available at <http://research.microsoft.com/pubs/71445/ForestFire.pdf>,(2008),pp. 595-608.

Shotton, Jamie et al., "Distributed Decision Tree Training", U.S. Appl. No. 12/797,430, filed Jun. 9, 2010., (dated Jun. 9, 2010),36 pages.

Podlozhnyuk, Victor, "Histogram calculation in CUDA." NVIDIA Corporation, White Paper, Revised Nov. 9, 2007, 11 pages.

Yang, Zhiyi et al., "Parallel Image Processing Based on CUDA", 2008 International Conference on Computer Science and Software Engineering, Dec. 2008, pp. 42-45.

State Intellectual Property Office of China, Office Action for Chinese Patent Application No. 201110447930.8, dated Jan. 24, 2014, 15 pages.

State Intellectual Property Office of China, Office Action of Chinese Patent Application No. 201110443208.7, dated Nov. 21, 2013, 12 pages.

\* cited by examiner

402
Classify one or more pixels of an image by a computing device as having one or several states for one or more attributes that do not identifying an associated body part of a user

404
Recognize a gesture by the computing device that is operable to initiate one or more operations of the computing device based at least in part on the state classifications of the one or more pixels of the one or more attributes

406
Aggregate the classifications

408
Examine pixels that relate to one or more parts of the body that define the gesture and excluding pixels that do not relate to the one or more parts of the body

ATTRIBUTE STATE CLASSIFICATION

BACKGROUND

The amount of devices that are made available for a user to interact with a computing device is ever increasing. For example, interaction with a computing device was initially performed using text. Therefore, a user typically entered the text using a keyboard and viewed an output by the computing device that was also in text.

These techniques were then expanded into graphical user interfaces in which a user could interact with a cursor control device, such as a mouse. The techniques continued to expand as graphical user interfaces were configured to recognize gestures made by a user to provide inputs to the computing device. For example, gestures may be used to select objects, interact with a video game, and so on. However, these conventional techniques could consume a significant amount of computing resources, which could slow interaction with the computing device using these conventional techniques as well as increase the cost of a computing device that is configured to employ the techniques.

SUMMARY

Attribute state classification techniques are described. In one or more implementations, one or more pixels of an image are classified by a computing device as having one or several states for one or more attributes that do not identify corresponding body parts of a user. A gesture is recognized by the computing device that is operable to initiate one or more operations of the computing device based at least in part of the state classifications of the one or more pixels of one or more attributes.

In one or more implementations, pixels of an image are classified by a computing device as belonging to particular parts of an object and as having a state for one or more attributes that relate to the parts. The classifications of the attribute states of the pixels are aggregated by the computing device to derive an aggregate classification for the object.

In one or more implementations, pixels of an image are classified by a computing device as belonging to particular parts of a body and as having a state for one or more attributes that relate to the parts. A gesture is recognized by the computing device, which is operable to initiate one or more operations of the computing device, by examining pixels that relate to one or more parts of the body that define the gesture and excluding pixels that do not relate to the one or more parts of the body.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Input techniques that may be utilized to interact with a computing device have evolved from text input techniques typically implemented using a keyboard to gestures that may be captured using a camera. For example, a camera may be used to take an image of one or more body parts of a user and recognize a gesture from the image. This gesture may then be used to interact with a user interface output by the computing device. However, conventional techniques that were used to recognize gestures were stateless and thus relied on an identity of an object.

Attribute state classification techniques are described. In one or more implementations, techniques are described to predict an identity of a body part as well as a state of an attribute of the body part for pixels in an image. Example attributes include orientation (e.g., pose), shape, appearance, and so on. For example, a body part of a hand may be identified as well as a state of an attribute of the hand, e.g., closed. This state may also be computed from states of attributes of parts of the hand, such as states of a palm and fingers of the hand which may then be aggregated to determine an overall state of the hand. The states of the attributes for the body parts may then be used as to help recognize a gesture that may be used to initiate a function of a computing device. Further discussion of attribute state classification techniques may be found in relation to the following sections.

In the following discussion, an example environment is first described that is operable to employ attribute state classification techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
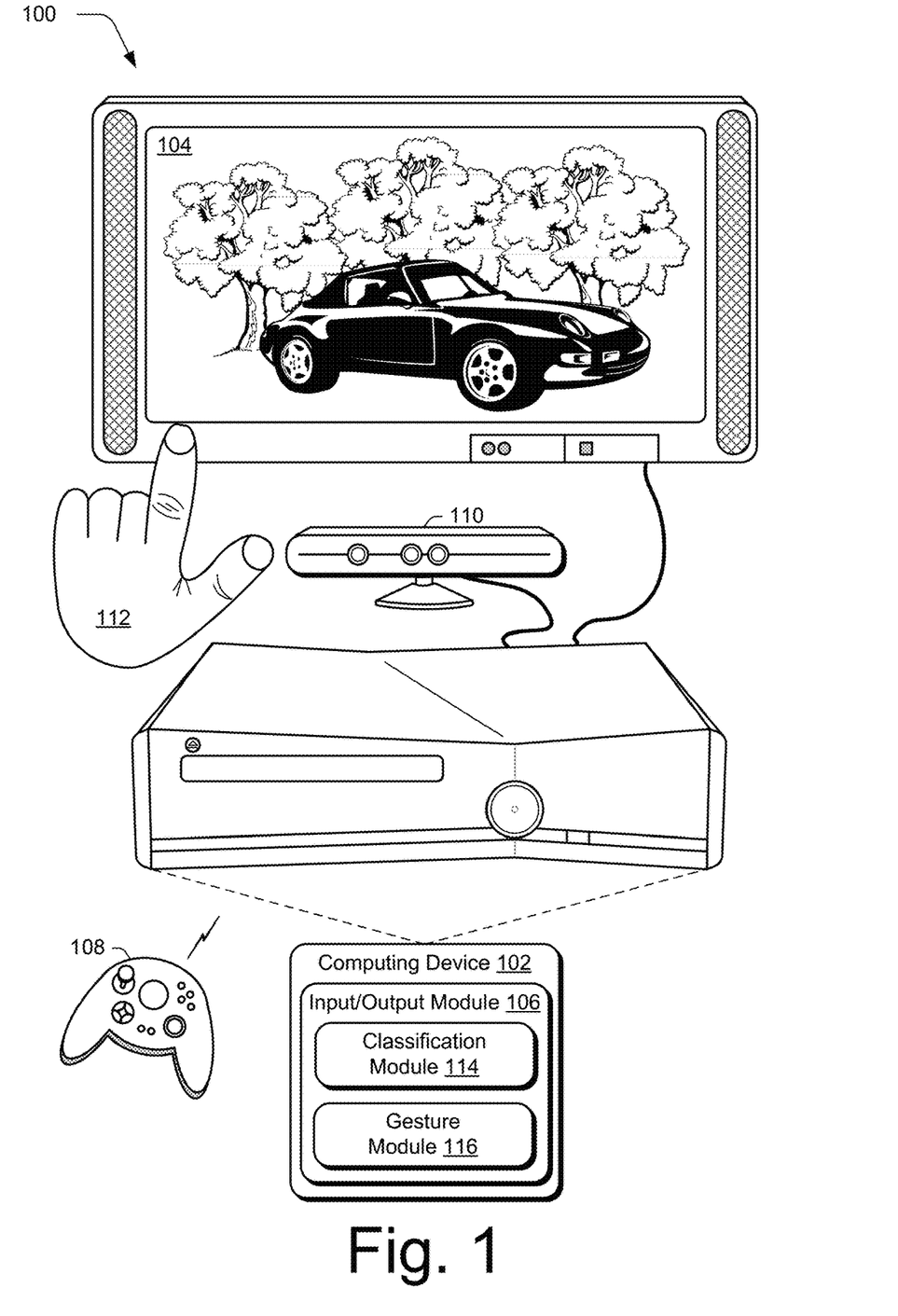
FIG. 1 is an illustration of an environment in an example implementation that is operable to employ attribute state classification techniques described herein.

FIG. 1 is an illustration of an environment 100 in an example implementation that is operable to employ attribute state classification techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a game console communicatively coupled to a display device 104 (e.g., a television) as illustrated, a wireless phone, a tablet, a netbook, and so forth as further described beginning in relation to FIG. 5. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input/output module 106 having a classification module 114 and a gesture module 116. The input/output module 106 is representative of functionality relating to recognition of inputs and/or provision of outputs by the computing device 102. For example, the input/output module 106 may be configured to receive inputs from a keyboard, mouse, to identify gestures and cause operations to be performed that correspond to the gestures using the gesture module 116, and so on. The inputs may be detected by the input/output module 106 in a variety of different ways.

The input/output module 106 may be configured to receive one or more inputs via touch interaction with a hardware device, such as a controller 108 as illustrated. Touch interaction may involve pressing a button, moving a joystick, movement across a track pad, use of a touch screen of the display device 104 (e.g., detection of a finger of a user's hand or a stylus), and so on. Recognition of the touch inputs may be leveraged by the input/output module 106 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102), and other devices that involve touch on the part of a user or object.

The input/output module 106 may also be configured to provide a natural user interface (NUI) that may recognize interactions that may not involve touch. For example, the computing device 102 may include a NUI input device 110. The NUI input device 110 may be configured in a variety of ways to detect inputs without having a user touch a particular device, such as to recognize audio inputs through use of a microphone. For instance, the input/output module 106 may be configured to perform voice recognition to recognize particular utterances (e.g., a spoken command) as well as to recognize a particular user that provided the utterances.

In another example, the NUI input device 110 that may be configured to recognize gestures, presented objects, and so on through use of a camera. The camera, for instance, may be configured to include multiple lenses so that different perspectives may be captured and thus determine depth. The different perspectives, for instance, may be used to determine a relative distance from the NUI input device 110 and thus a change in the relative distance. The different perspectives may be leveraged by the computing device 102 as depth perception. The images may also be leveraged by the input/output module 106 to provide a variety of other functionality, such as techniques to identify particular users (e.g., through facial recognition), objects, and so on.

The input-output module 106 may leverage the NUI input device 110 to perform skeletal mapping along with feature extraction of particular points of a human body (e.g., 48 skeletal points) to track one or more users (e.g., four users simultaneously) to perform motion analysis. For instance, the NUI input device 110 may capture images that are analyzed by the input/output module 106 to recognize one or more motions made by a user, including what body part is used to make the motion as well as which user made the motion. An example is illustrated through recognition of positioning and movement of one or more fingers of a user's hand 112 and/or movement of the user's hand 112 as a whole. The motions may be identified as gestures by the gesture module 116 of the input/output module 106 to initiate a corresponding operation.

A variety of different types of gestures may be recognized, such a gestures that are recognized from a single type of input (e.g., a motion gesture) as well as gestures involving multiple types of inputs, e.g., a motion gesture and an object gesture made using an object such as a stylus. Thus, the input/output module 106 may support a variety of different gesture techniques by recognizing and leveraging a division between inputs. It should be noted that by differentiating between inputs in the natural user interface (NUI), the number of gestures that are made possible by each of these inputs alone is also increased. For example, although the movements may be the same, different gestures (or different parameters to analogous commands) may be indicated using different types of inputs. Thus, the input/output module 106 may provide a natural user interface that supports a variety of user interaction's that do not involve touch.

Accordingly, although the following discussion may describe specific examples of inputs, in instances different types of inputs may also be used without departing from the spirit and scope thereof. Further, although in instances in the following discussion the gestures are illustrated as being input using a NUI, the gestures may be input using a variety of different techniques by a variety of different devices, such as to employ touchscreen functionality of a tablet computer.

As previously described, the input/output module 106 is also illustrated as including a classification module 114. The classification module 114 is representative of functionality of the computing device 102 to identify parts of objects as well as classify attribute states for those parts. Continuing with the previous example, the classification module 114 may recognize parts of the user's hand 112, such as fingers and palm, from an image taken by a camera of the NUI input device 110. The classification module 114 may also identify an attribute state for those parts. The state of the attributes and the identification of the respective body part may be used as a basis to recognize a gesture by the gesture module 116. In this way, the classification module 114 may support a rich definition of gestures that may be efficiently processed by the computing device 102, further discussion of which may be found in relation to FIG. 2.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the laser mode techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
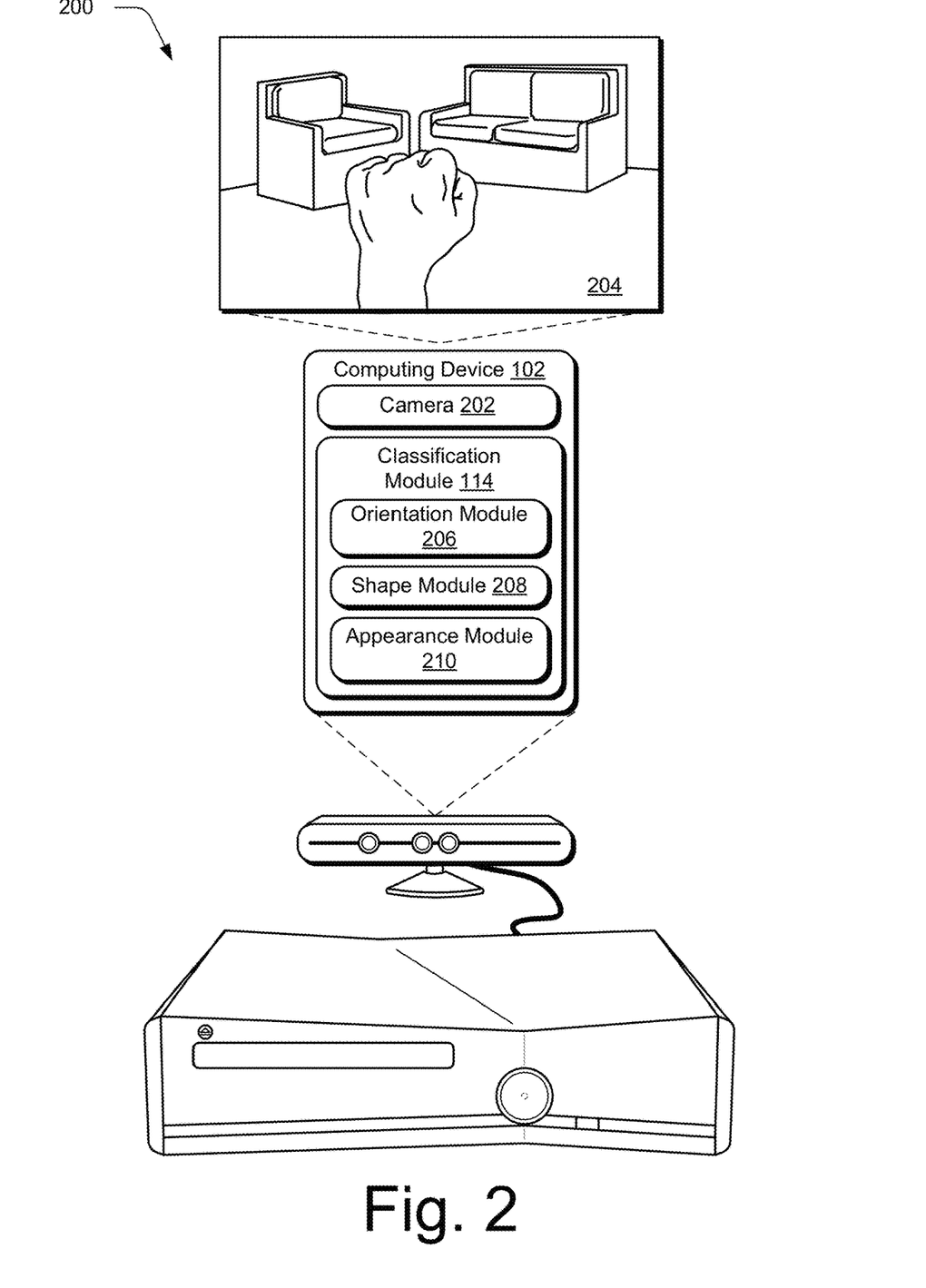
FIG. 2 illustrates an example system showing a classification module of FIG. 1 in greater detail as configured to classify pixels according to a plurality of attributes and states of those attributes.

FIG. 2 depicts a system 200 in an example implementation in which the classification module 114 of FIG. 1 is shown in greater detail. The computing device 102 in this example includes the classification module 114 as described in relation to FIG. 1 as well as a camera 202 that captures an image 204 of physical surroundings of the computing device 102. Although the computing device 102 captures the image in this example (e.g., through use of a camera 202 of the NUI input device 110), the computing device 102 may receive an image 204 in a variety of other ways, such as at a cloud platform as part of an interconnected environment as described in relation to FIG. 5.

Continuing with the discussion of FIG. 1, the classification module 114 may be used to extend earlier techniques to identify a part of an object (e.g., a body part of a user) as well as an attribute state. Examples of this are illustrated for the classification module 114 as an orientation module 206, a shape module 208, and an appearance module 210. Each of these modules is an example of an attribute having a corresponding state that may be classified by the computing device 102.

The orientation module 206, for instance, may be configured to detect poses of one or more body parts of a user. As shown in the image 204, a user's hand may be clenched into a fist. Accordingly, the orientation module 206 may assign a "closed" state for a pose attribute to pixels of the hand in the image 204 that correspond to the user's hand. A variety of other mappings are also contemplated, such as to map continuous joint angles of body parts to a state.

The shape module 208 is representative of functionality to classify states of shape attributes for parts of an object. For example, the shape module 208 may assign a state for a body mass index scale to the user's hand shown in the image 204, a gender, a size (e.g., small, medium, or large for clothing options), clothing type (e.g., trousers, skirt, dress) and so on. The state may then be used for a variety of purposes, such as a gesture to generate an avatar to accurately represent a user of the computing device, provide clothing options for a shopping application, and so forth. A variety of other states are also contemplated, such as shapes of objects in the image 204 to recognize the objects, e.g., chair and couch for a furniture attribute.

The appearance module 210 is representative of functionality to classify states for appearance attributes. As before, a variety of different states may be assigned for a variety of different attributes, such as textures (e.g., rough, smooth, pile), skin tones, colors, dress state (e.g., naked, semi-naked, fully clothed through identification of skin regions) and so on. Thus, the classification module 114 may support a variety of different attributes and states for those attributes. It should be readily apparent that a variety of other attributes are also contemplated without departing from the spirit and scope thereof.

The classification module 114 may also be configured to aggregate attributes. For example, the classification module 114 may combine classifications from various parts of an object to derive a single dominate state. The classification module 114 may also utilize classifications taken at different points in time. For instance, the classification module 114 may examine several frames having defined states for attributes to interpret a sequence that may be used as a basis to recognize a gesture to initiate an operation of the computing device 102. A user, for example, could provide a sequence of gestures to work as a vocabulary that may be interpreted by the computing device 102 to initiate a respective operation based on the sequence. The classification performed by the classification module 114 may be performed in a variety of ways, further discussion of which may be found in relation to the following figure.

Figure 3:
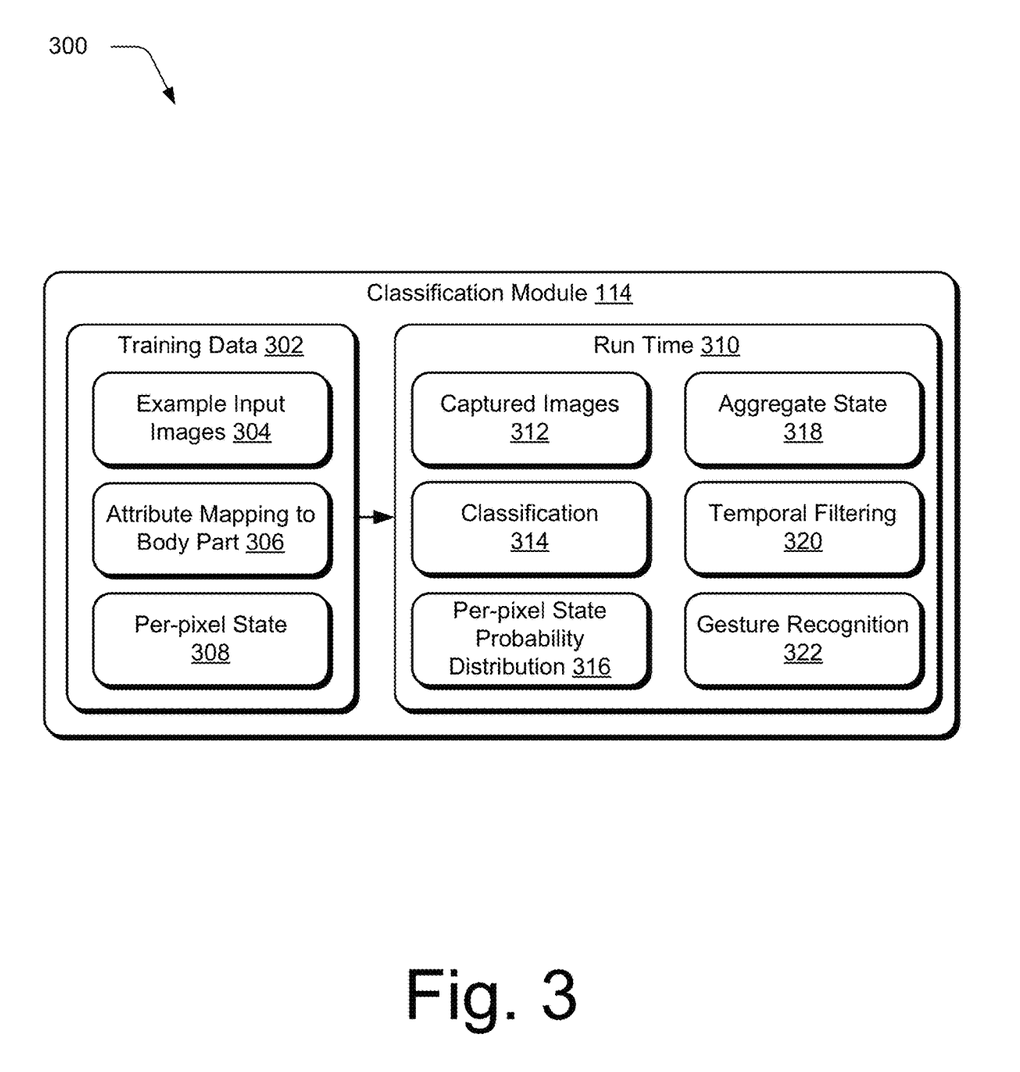
FIG. 3 depicts a system in an example implementation in which operation of the classification module of FIG. 1 using training data and during runtime is shown.

FIG. 3 depicts a system 300 in an example implementation in which operation of the classification module 114 using training data and during runtime is shown. At the training data 302 stage, example input images 304 are used for attribute mapping to a body part 306 and classification of per-pixel states 308. For example, these techniques may be employed to map pixels to associated part. This may include mapping the pixels to parts to which the pixel belong as well as mapping to a corresponding parts. The pixel may be mapped to a "nearest joint" attribute (e.g., wrist, elbow, shoulder, and so on), for instance, to derive skeleton joint locations by averaging or use of mean-shift analysis to perform skeleton tracking. The example input images 304 may take a variety of forms, such as sensor image data including depth image data, red/green/blue (RGB) images, infrared and near infrared images, and other images from which feature descriptors may be extracted and used to classify a state for an attribute.

Previous systems employed body part recognition by relying on a machine learning technique (e.g., decision trees with features based on depth differences between pairs of pixel locations) to predict associations between pixels and body parts in a depth map together with confidence values. In one instantiation, the previous systems used example depth images of different people in various poses for training that have an associated label image that essentially segments the depth map into individual body part regions.

In the techniques described herein, however, different image labels may be used to denote a state of an attribute for a body part as well as include an identifier of the body part. This state can be a function of a variety of different attributes, such as orientation (e.g., pose), shape, appearance, and so forth. Examples of pose dependent states include whole body poses (e.g., standing, sitting, lying down), body-part specific poses, e.g., canonical hand poses such as open palm, closed fist, an "OK" or "peace" sign, and so forth. The state may also be a function of shape, such as gender, or clothing sizes (S/M/L/XL), body mass index (BMI) ranges, and so forth. It can also be a function of appearance that relates to an entire body (e.g., a state of clothing). In one or more implementations, states of individual body parts in synthetically generated training data (e.g., generated using motion capture data and CGI) may be determined by specifying a mapping from pose (e.g., continuous joint angles) to state (e.g., discrete such as open or closed).

Gestures may be defined using select parts of an object, e.g., parts of a user's body. Accordingly, these parts are used to recognize a gesture while other parts that are not involved in the definition are excluded from the recognition analysis. The irrelevant regions on the body, for instance, may be assigned a NULL class, similar to objects located in a background of the image 204. As an example, in the case of hand poses used to determine whether the hand is open or closed, the pixels covering the palm and fingers may be assigned a hand pose state while other pixels that do not pertain to those parts of the body may be excluded from the analysis.

At run time 310 for a captured image 312 (e.g., captured by the camera 202), the output of the classification 314 may be configured as a probability distribution 316 over an entire state domain for each pixel of the captured images 312. Overall state aggregation 318 may also be achieved by finding a simple average over the entirety of the captured image 312 for each domain state, a weighted average that combines a classified state for each pixel with a likelihood that the pixel is part of a body region that exerts an influence on that state class, and so forth. The aggregate state 318 may be obtained in a variety of other ways, such as by using the previous system that classifies pixels to body parts. For example, pixels that are classified as being less likely to be on the hand would have less say (e.g., a lower weighting) on whether a hand is ultimately classified as open or closed in comparison with pixels that are included on the hand.

Temporal filtering 320 (e.g. for example Gaussian smoothing, bilateral filtering, or extrapolation based on past predictions) of predicted states between consecutive frames may also be performed to reduce the impact of spurious state changes. Additionally, the classification module 114 may be set to detect predefined sequences of states in order to do gesture recognition (e.g., by forming sentences using sign language hand poses) in the case of pose dependent attributes. An output may then be formed using one or more of these techniques that is compatible for gesture recognition 322, e.g., for processing by the gesture module 116 using machine learning to recognize a gesture. In this way, the attribute state classification may improve efficiency of the gesture module 116 by preprocessing the pixels to include attribute states. Although a few examples of attributes and states have been described, it should be readily apparent that a wide variety of states may be classified to pixels that describe attributes of objects in an image without departing from the spirit and scope thereof.

Example Procedure

The following discussion describes attribute state classification techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3, respectively.

Figure 4:
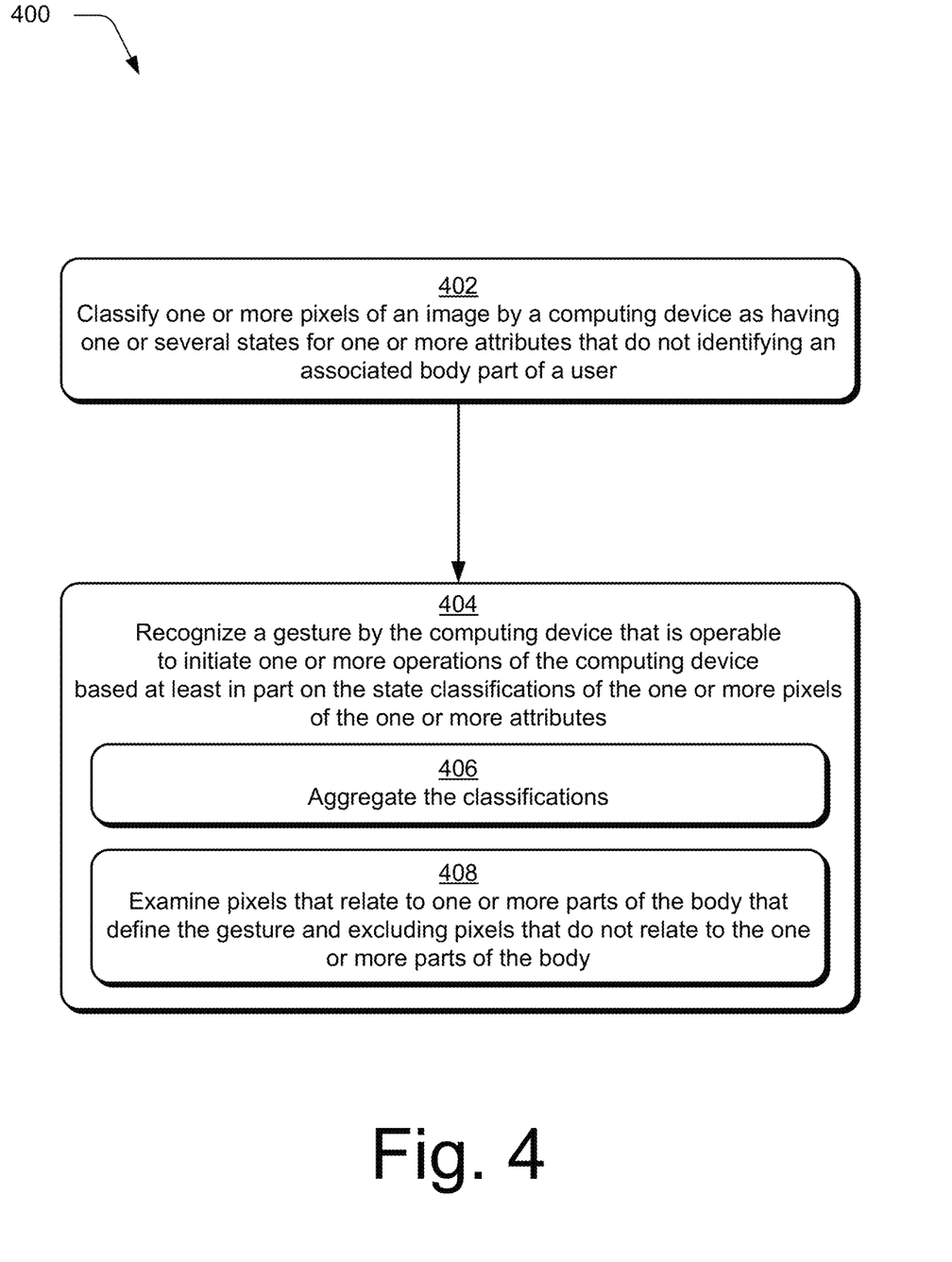
FIG. 4 is a flow diagram depicting a procedure in an example implementation in which pixels of an image are classified and used to recognize a gesture.

FIG. 4 depicts a procedure 400 in an example implementation in which pixels of an image are classified and used to recognize a gesture. One or more pixels of an image are classified by a computing device as having one of several states for one or more attributes that do not identify an associated body part of a user (block 402). For example, the pixels may be classified into one or more states of attributes for that object, such as orientation (e.g., pose), shape, appearance, and so forth. A variety of other objects may also be recognized, such as parts of a toy, objects in a room, and so forth. Further, the techniques may also employ another attribute that does identifying an associated part (e.g., body part) of an object as previously described.

A gesture is recognized by the computing device that is operable to initiate one or more operations of the computing device based at least in part on the state classifications of the one or more pixels of the one or more attributes (block 404). The gesture module 116, for instance, may receive image data having pixels that are classified into one or more attribute states such as orientation, shape, appearance, and so on. The gesture module 116 may then leverage these stages to efficiently recognize a gesture, such as a selection gesture input through making a fist by a user's hand as shown in the image 204 of FIG. 2.

The recognizing of the gesture may also leverage a variety of additional functionality. For example, aggregation of the classifications may be performed (block 406). Additionally, the pixels that relate to one or more parts of the body that define the gesture for the other attribute described above may be examined and pixels that do not relate to the one or more parts of the body may be excluded (block 408). For example, a gesture definition may involve particular parts of a human body. Accordingly, body parts that fall within the definition of the gesture may be examined and pixels that relate to other body parts or objects may be excluded from the examination. A variety of other aggregation techniques are also contemplated.

Example System and Device

Figure 5:
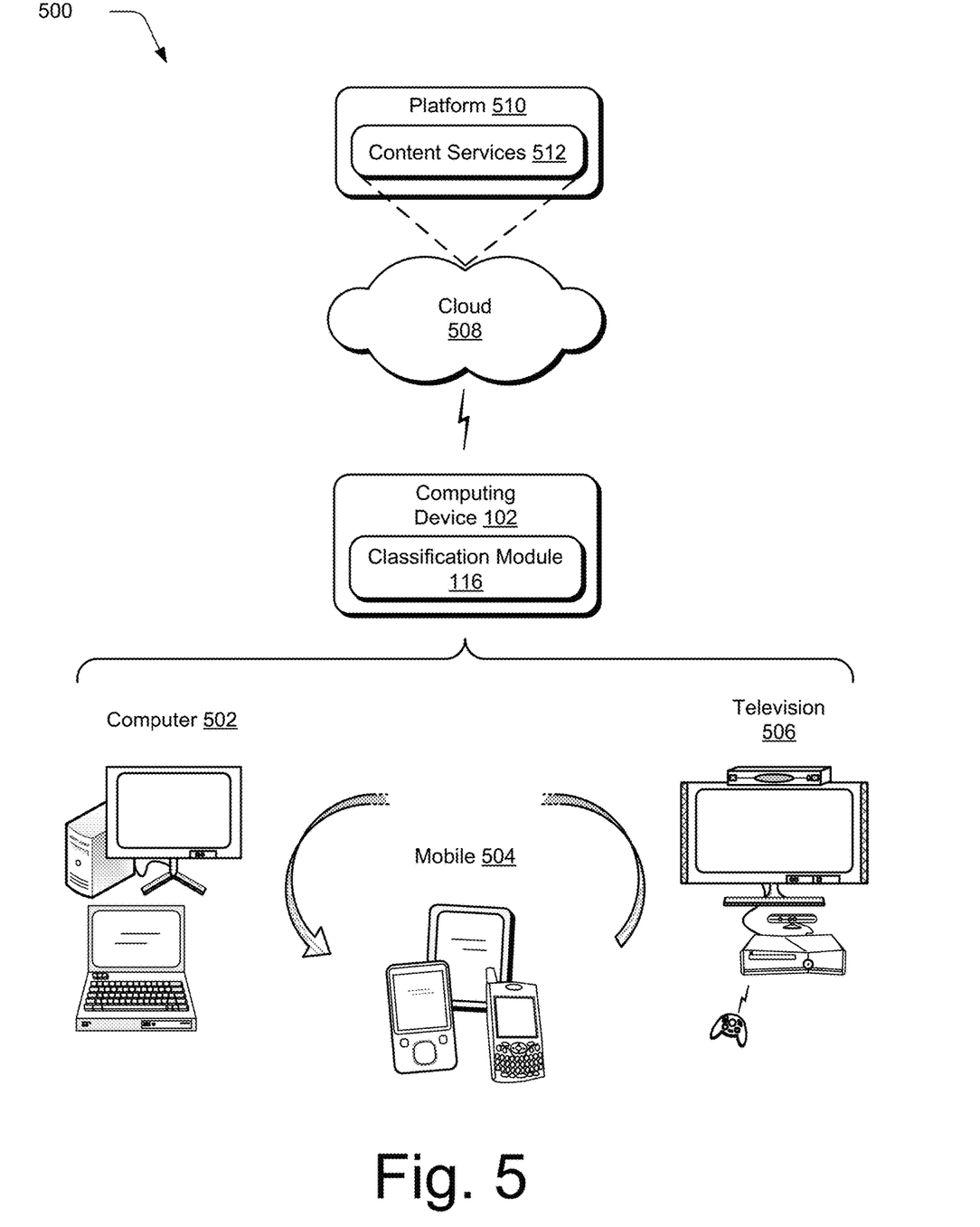
FIG. 5 illustrates an example system that illustrated various configuration of a computing device as described with reference to FIG. 1.

FIG. 5 illustrates an example system 500 that includes the computing device 102 as described with reference to FIG. 1. The example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 502, mobile 504, and television 506 uses. Each of these configurations includes devices that may have generally different constructs and capabilities, and thus the computing device 102 may be configured according to one or more of the different device classes. For instance, the computing device 102 may be implemented as the computer 502 class of a device that includes a personal computer, desktop computer, a multi-screen computer, laptop computer, netbook, and so on.

The computing device 102 may also be implemented as the mobile 502 class of device that includes mobile devices, such as a mobile phone, portable music player, portable gaming device, a tablet computer, a multi-screen computer, and so on. The computing device 102 may also be implemented as the television 506 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 508 includes and/or is representative of a platform 510 for content services 512. The platform 510 abstracts underlying functionality of hardware (e.g., servers) and software resources of the cloud 508. The content services 512 may include applications and/or data that can be utilized while computer processing is executed on servers that are remote from the computing device 102. Content services 512 can be provided as a service over the Internet and/or through a subscriber network, such as a cellular or Wi-Fi network.

The platform 510 may abstract resources and functions to connect the computing device 102 with other computing devices. The platform 510 may also serve to abstract scaling of resources to provide a corresponding level of scale to encountered demand for the content services 512 that are implemented via the platform 510. Accordingly, in an interconnected device embodiment, implementation of functionality of the functionality described herein may be distributed throughout the system 500. For example, the functionality may be implemented in part on the computing device 102 as well as via the platform 510 that abstracts the functionality of the cloud 508.

Figure 6:
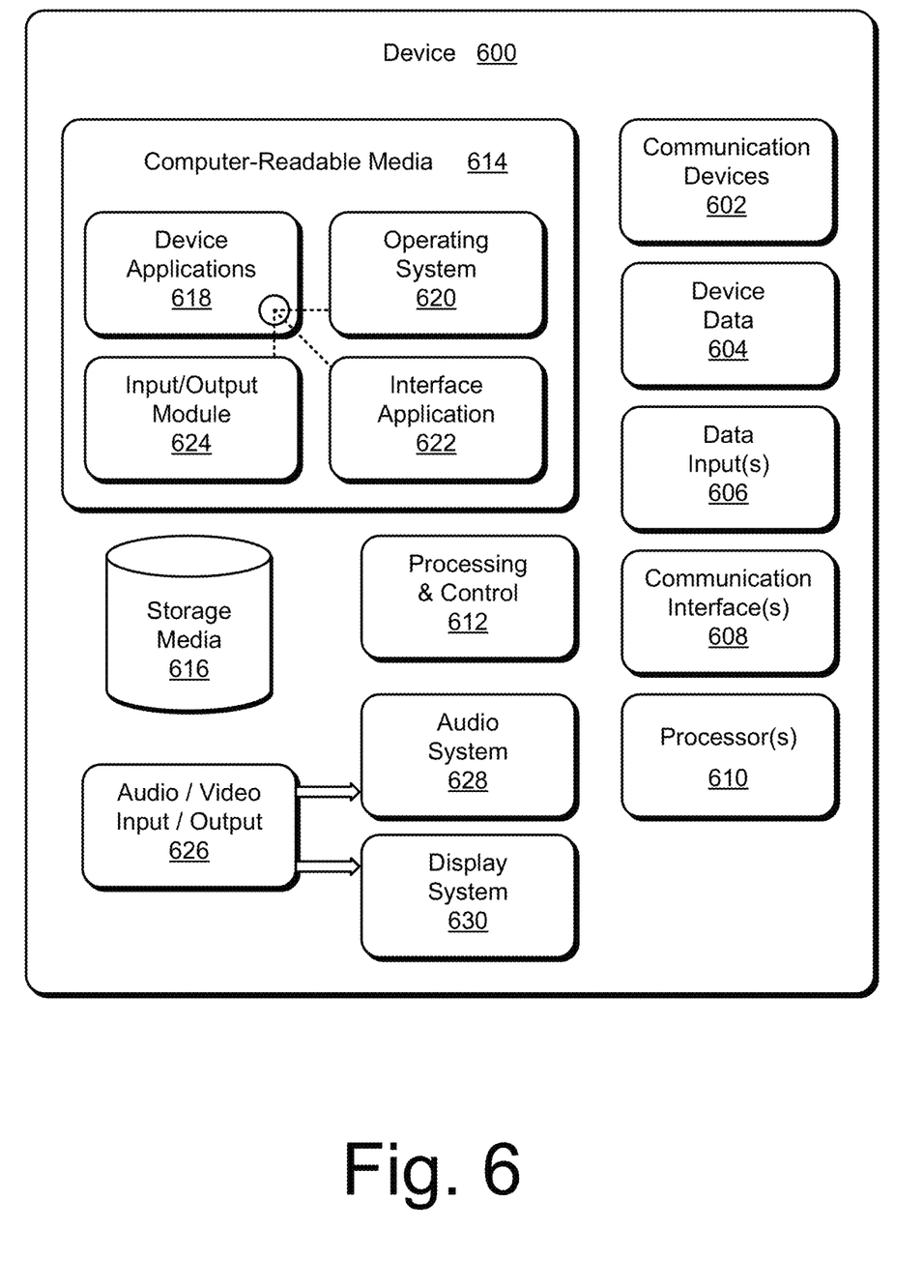
FIG. 6 illustrates various components of an example device that can be implemented as any type of portable and/or computer device as described with reference to FIGS. 1, 2, and 5 to implement embodiments of the techniques described herein.

FIG. 6 illustrates various components of an example device 600 that can be implemented as any type of computing device as described with reference to FIGS. 1, 2, and 5 to implement embodiments of the techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of the techniques described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the gesture techniques described herein.

In this example, the device applications 618 include an interface application 622 and an input/output module 624 (which may be the same or different as input/output module 114) that are shown as software modules and/or computer applications. The input/output module 624 is representative of software that is used to provide an interface with a device configured to capture inputs, such as a touchscreen, track pad, camera, microphone, and so on. Alternatively or in addition, the interface application 622 and the input/output module 624 can be implemented as hardware, software, firmware, or any combination thereof. Additionally, the input/output module 624 may be configured to support multiple input devices, such as separate devices to capture visual and audio inputs, respectively.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. On a computing device, a method comprising:
receiving, via executing instructions on the computing device, an image from a camera;
identifying, via executing the instructions on the computing device, a subset of pixels of the image as belonging to a body part of a person captured in the image;
classifying, via executing the instructions on the computing device, each pixel of the subset of pixels of the image into a state classification selected from two or more possible state classifications for an attribute of the body part that docs not in addition to identifying the body part of the person captured in the image;
recognizing, via executing the instructions on the computing device, a gesture that is operable to initiate one or more operations of the computing device based at least in part on each selected state classification for each pixel of the subset of pixels that at least excludes other pixels of the image that do not belong to the body part; and
performing, via executing the instructions by the computing device, the one or more operations in response to the recognizing of the gesture.

2. The method of claim 1, wherein the image includes depth data.

3. The method of claim 1, wherein the classifying is performed via a classifier executed by the computing device, and further comprising training the classifier by performing a training classification with training images including the body part in each state classification of the two or more possible state classifications of the attribute of the body part.

4. The method of claim 1, wherein the recognizing comprises combining each selected state classification for each pixel of the subset of pixels to derive a dominant state of the attribute of the body part.

5. The method of claim 4,
wherein the classifying classifies each pixel of the subset of pixels of the image that belong to the body part and excludes pixels of the image that correspond to a different body part.

6. The method of claim 1, further comprising:
identifying, via executing the instructions on the computing device, one or more additional subsets of pixels of one or more additional images as belonging to the body part, each image of the one or more additional images taken at different points in time;
classifying, via executing the instructions on the computing device, each pixel of the one or more additional subsets of pixels of the one or more additional images into a state classification selected from the two or more possible state classifications; and
wherein the recognizing further comprises combining each selected state classification for each pixel of the one or more additional subsets of pixels from the one or more additional images taken at the different points in time.

7. The method of claim 6, wherein the recognizing includes examining each selected state classification for each pixel of the one or more additional subsets of pixels from the one or more additional images from the different points in time to identify a sequence that is indicative of the gesture.

8. The method of claim 1, wherein the attribute relates to an orientation of the body part.

9. The method of claim 1, wherein the body part is a hand, the attribute comprises a pose of the hand, and the two or more possible state classifications include a closed hand and an open hand.

10. The method of claim 1, wherein the classifying includes:
classifying a first group of pixels of the subset of pixels of the image into a first state classification selected from the two or more possible state classifications,
classifying a second group of pixels of the subset of pixels of the image into a second state classification selected from the two or more possible state classifications,
setting the selected first state classification as a dominant state of the attribute of the body part when the first group of pixels includes more pixels than the second group of pixels; and
setting the selected second state classification as the dominant state of the attribute of the body part when the first group of pixels includes fewer pixels than the second group of pixels.

11. The method of claim 10, wherein the recognizing is further based on the dominant state of the attribute of the body part.

12. A system of one or more computing devices, comprising:
one or more processors; and
one or more computer-readable media devices having instructions stored thereon executable by the one or more processors to:
receive an image from a camera;
identify a subset of pixels of the image as belonging to a body part of a person captured in the image;
classify each pixel of the subset of pixels of the image into a state classification selected from two or more possible state classifications for an attribute of the body part in addition to identifying the body part of the person captured in the image;
recognize a gesture that is operable to initiate one or more operations of the computing system based at least in part on each selected state classification for each pixel of the subset of pixels that at least excludes other pixels of the image that do not belong to the body part; and perform the one or more operations in response to recognizing the gesture.

13. The computing system of claim 12, wherein the image includes depth data; and wherein the attribute relates to an orientation of the body part.

14. The computing system of claim 12, wherein each pixel is classified via a classifier of the instructions executed by the one or more processors, and wherein the one or more computer-readable media devices have further instructions stored thereon executable by the one or more processors to train the classifier by performing a training classification with training images including the body part in each state classification of the two or more possible state classifications of the attribute of the body part.

15. The computing system of claim 12, wherein the one or more computer-readable media devices have further instructions stored thereon executable by the one or more processors to recognize the gesture by combining each selected state classification for each pixel of the subset of pixels to derive a dominant state of the attribute of the body part.

16. The computing system of claim 15, wherein the one or more computer-readable media devices have further instructions stored thereon executable by the one or more processors to classify each pixel of the subset of pixels by classifying each pixel of the subset of pixels of the image that belong to the body part and excluding pixels of the image that correspond to a different body part.

17. The computing system of claim 12, wherein the one or more computer-readable media devices have further instructions stored thereon executable by the one or more processors to:

identify one or more additional subsets of pixels of one or more additional images as belonging to the body part, each image of the one or more additional images taken at different points in time;

classify each pixel of the one or more additional subsets of pixels of the one or more additional images into a state classification selected from the two or more possible state classifications; and wherein the gesture is recognized by combining each selected state classification for each pixel of the one or more additional subsets of pixels from the one or more additional images taken at the different points in time.

18. The computing system of claim 17, wherein the one or more computer-readable media devices have further instructions stored thereon executable by the one or more processors to recognize the gesture by examining each selected state classification for each pixel of the one or more additional subsets of pixels from the one or more additional images from the different points in time to identify a sequence that is indicative of the gesture.

19. The computing system of claim 12, wherein the one or more computer-readable media devices have further instructions stored thereon executable by the one or more processors to:

classify a first group of pixels of the subset of pixels of the image into a first state classification selected from the two or more possible state classifications, classify a second group of pixels of the subset of pixels of the image into a second state classification selected from the two or more possible state classifications, set the selected first state classification as a dominant state of the attribute of the body part when the first group of pixels includes more pixels than the second group of pixels; and set the selected second state classification as the dominant state of the attribute of the body part when the first group of pixels includes fewer pixels than the second group of pixels.

20. The computing system of claim 19, wherein the one or more computer-readable media devices have further instructions stored thereon executable by the one or more processors to recognize the gesture further based on the dominant state of the attribute of the body part.

* * * * *